United States Patent
Jung et al.

(10) Patent No.: US 10,044,070 B2
(45) Date of Patent: Aug. 7, 2018

(54) BATTERY MODULE

(71) Applicant: LG CHEM, LTD., Seoul (KR)

(72) Inventors: Seung Hun Jung, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 24 days.

(21) Appl. No.: 14/758,727

(22) PCT Filed: Dec. 15, 2014

(86) PCT No.: PCT/KR2014/012345
§ 371 (c)(1),
(2) Date: Jun. 30, 2015

(87) PCT Pub. No.: WO2015/115733
PCT Pub. Date: Aug. 6, 2015

(65) Prior Publication Data
US 2016/0329608 A1    Nov. 10, 2016

(30) Foreign Application Priority Data

Jan. 28, 2014 (KR) .................. 10-2014-0010120

(51) Int. Cl.
*H01M 2/00* (2006.01)
*H01M 10/42* (2006.01)
*H01M 2/10* (2006.01)

(52) U.S. Cl.
CPC ..... *H01M 10/4235* (2013.01); *H01M 2/1016* (2013.01); *H01M 2/1061* (2013.01); *H01M 2/1094* (2013.01); *H01M 2200/00* (2013.01)

(58) Field of Classification Search
CPC ........... H01M 10/4235; H01M 2/1016; H01M 2/1061; H01M 2/1094; H01M 2200/00
See application file for complete search history.

(56) References Cited

U.S. PATENT DOCUMENTS

| | | | |
|---|---|---|---|
| 5,714,277 A * | 2/1998 | Kawakami | H01M 2/1686 429/129 |
| 2002/0142195 A1* | 10/2002 | Ehara | H01M 2/0215 429/7 |
| 2006/0177729 A1* | 8/2006 | Campau | A62C 4/02 429/86 |
| 2006/0275665 A1 | 12/2006 | Hyung et al. | |

(Continued)

FOREIGN PATENT DOCUMENTS

| | | |
|---|---|---|
| CN | 201413858 Y | 2/2010 |
| JP | 2007-184189 A | 7/2007 |

(Continued)

OTHER PUBLICATIONS

Computer translation of Ding et al. (CN 103682188 A).*
Computer translation of DEMIZU et al. (JP 2013161735 A).*

*Primary Examiner* — Jane J Rhee
(74) *Attorney, Agent, or Firm* — Birch, Stewart, Kolasch & Birch, LLP (57) ABSTRACT

The present invention relates to a battery module. The battery module includes a battery cell, a module case in which the battery cell is built, and a flame retardant filled in the module case. Thus, when the battery module is damaged, an insulation film is formed on the damaged portion to prevent fire or explosion from occurring.

15 Claims, 6 Drawing Sheets

(56) References Cited

U.S. PATENT DOCUMENTS

| | | | |
|---|---|---|---|
| 2008/0292950 A1* | 11/2008 | Maeda | H01M 2/1061 429/120 |
| 2010/0159334 A1 | 6/2010 | Kashima et al. | |
| 2010/0221601 A1 | 9/2010 | Fukuda | |
| 2011/0052965 A1 | 3/2011 | Kim et al. | |
| 2011/0082060 A1* | 4/2011 | Faci | C10M 169/06 508/161 |
| 2011/0091748 A1 | 4/2011 | Hyung et al. | |
| 2011/0165454 A1* | 7/2011 | Iwamoto | H01M 2/1094 429/163 |
| 2012/0264661 A1* | 10/2012 | Tsubouchi | C10M 105/04 508/110 |
| 2013/0029888 A1* | 1/2013 | Beret | C10M 169/06 508/167 |
| 2013/0146603 A1* | 6/2013 | Brilmyer | G11B 33/1406 220/560.01 |
| 2013/0183552 A1 | 7/2013 | Yang et al. | |
| 2013/0288094 A1* | 10/2013 | Noh | H01M 2/1077 429/99 |
| 2013/0323572 A1* | 12/2013 | Corson | H01M 2/1072 429/153 |
| 2014/0014376 A1 | 1/2014 | Schaefer | |
| 2014/0170447 A1* | 6/2014 | Woehrle | A62C 3/07 429/61 |
| 2015/0147602 A1* | 5/2015 | Bianchi | H01M 10/4235 429/50 |

FOREIGN PATENT DOCUMENTS

| | | |
|---|---|---|
| JP | 2009-295381 A | 12/2009 |
| JP | 2010-34002 A | 2/2010 |
| JP | 2010-126607 A | 6/2010 |
| KR | 10-2006-0115022 A | 11/2006 |
| KR | 10-2006-0059704 A | 6/2008 |
| KR | 10-2010-0007974 A | 1/2010 |
| KR | 10-2011-0024259 A | 3/2011 |
| KR | 10-2011-0071638 A | 6/2011 |
| KR | 10-2012-0062232 A | 6/2012 |
| KR | 10-2013-0071821 A | 7/2013 |
| WO | WO 2013160518 A1 * | 10/2013 ............... A62C 3/07 |
| WO | WO 2014/013981 A1 | 1/2014 |

\* cited by examiner

BATTERY MODULE

TECHNICAL FIELD

The present invention relates to a battery module, and more particularly, to a battery module in which an insulation film is formed on a damaged portion thereof when damaged to prevent explosion or fire from occurring.

BACKGROUND ART

In general, batteries are configured to obtain electric energy by using chemical or physical reaction. Here, chemical batteries are classified into primary and secondary batteries. That is, single-use batteries such as manganese batteries, alkaline batteries, and mercury batteries are called primary batteries, and rechargeable batteries such as rechargeable batteries or lead storage batteries are called secondary batteries.

The secondary batteries are being increasingly expected as power sources for driving motors of vehicles to reduce fossil fuel usage and carbon dioxide ($CO_2$) emission. Such secondary batteries are connected in series or parallel to constitute a battery module so as to increase a voltage or capacity.

However, when the battery module according to the related art is damaged by an external impact, short circuit may occur in the secondary batteries, and high current may flow instantly. Thus, the secondary batteries may be overloaded to cause fire or explosion due to overheating.

DISCLOSURE OF THE INVENTION

Technical Problem

An aspect of the present invention provides a battery module in which a flame retardant is filled so that when the battery module is damaged, the flame retardant permeates into the damaged portion to form an insulation film, thereby preventing explosion or fire from occurring

Technical Solution

According to an aspect of the present invention, there is provided a battery module including: a battery cell 110; a module case 120 in which the battery cell 110 is built; and a flame retardant 130 filled in the module case 120.

When battery cell 110 is damaged to cause short circuit, the flame retardant 130 may permeate into the short-circuited portion of the battery cell 110 to form an insulation film.

The flame retardant 120 may include flame retardant oil.

The flame retardant oil may include about 80 wt % to about 95 wt % of base oil, about 1 wt % to about 5 wt % of anti-abrasive, about 1 wt to about 5 wt % of organic molybdenum, and about 1 wt % to about 5 wt % of additive.

The flame retardant 130 has viscosity, and the flame retardant 130 includes grease and has non-conductivity.

The battery cell 110 may be provided in plurality, and the plurality of battery cells 110 may be built in the module case 120 in a state where the battery cells 110 are connected to each other in series or parallel.

The module case 120 may include: a sealing container 121 having an accommodation space for accommodating the battery cell 110; a cover 122 for finishing the accommodation space of the sealing container 121; and a sealing member 123 disposed on a contact surface on which the sealing container 121 is closely attached to the cover 122. The sealing container 121 and the cover 122 may be coupled to each other on the contact surface on which the sealing container 121 is closely attached to the cover 122 by using a bolt 124 and a nut 125. Thus, the sealing force between the upper end 121a of the sealing container 121 and the outer end 122a of the cover 122 may increase.

An injection part 122b for injecting the flame retardant into the accommodation space of the sealing space 121 may be disposed on the cover 122, and a check valve 122c for preventing the flame retardant injected into the accommodation space from flowing backward may be disposed in the injection part 122b.

An injection part 122b for injecting the flame retardant into the accommodation space of the sealing space 121 may be disposed on the cover 122, and the injection part 122b may be finished after the flame retardant 130 is injected.

An insulation layer 140 may be disposed on an inner circumferential surface of the module case 120.

The battery cell 110 may include: an electrode assembly 111; and a pouch case 112 in which the electrode assembly 111 is built. The electrode assembly 111 may have the form of a unit cell A that is constituted by a negative electrode plate 3, an positive electrode plate 1, and a separator disposed between the negative electrode plate 3 and the positive electrode plate 1 to electrically insulate the negative electrode plate 3 from the positive electrode plate 1 or a structure in which unit cells A are repeatedly stacked with a separator 4 therebetween.

That is, the battery cell 110 may realize the required voltage or capacity by repeatedly stacking one or more unit cells A each of which is constituted by the negative electrode plate 3, the separator 2, and the positive electrode plate 1.

Advantageous Effects

According to the present invention, the battery module may include the battery cell and the module case in which the battery cell is built. Here, the flame retardant may be filled in the module case so that when the battery cell is damaged, the flame retardant permeates into the damaged portion of the battery cell to form the insulation film, thereby preventing the explosion or fire from occurring and also improving durability of the battery cell through the non-conductivity and cooling ability of the flame retardant.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present disclosure will be omitted for clarity, and also like reference numerals in the drawings denote like elements.

Figure 1:
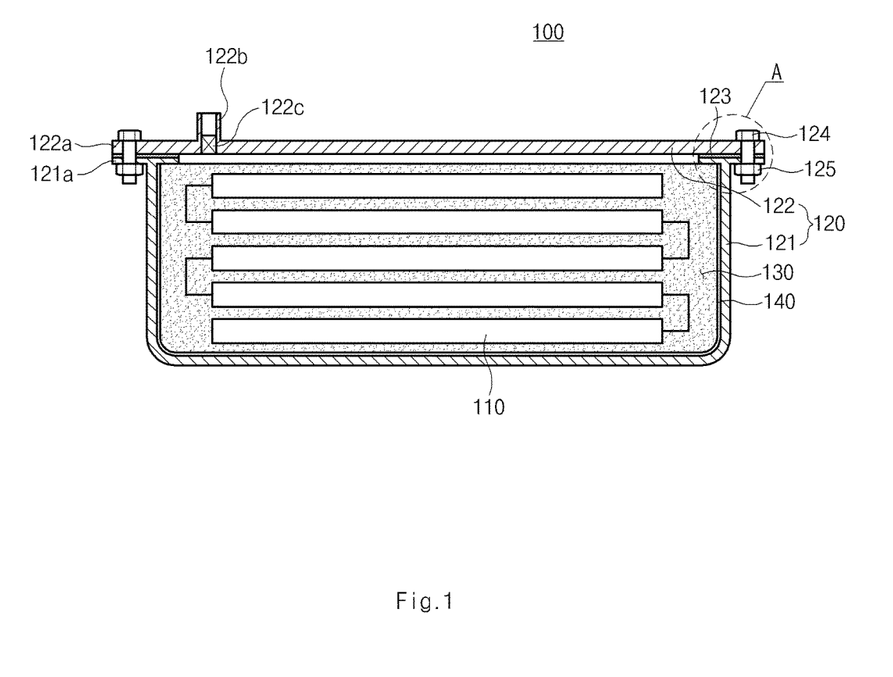
FIG. 1 is a cross-sectional view of a battery module according to the present invention.
Figure 2:
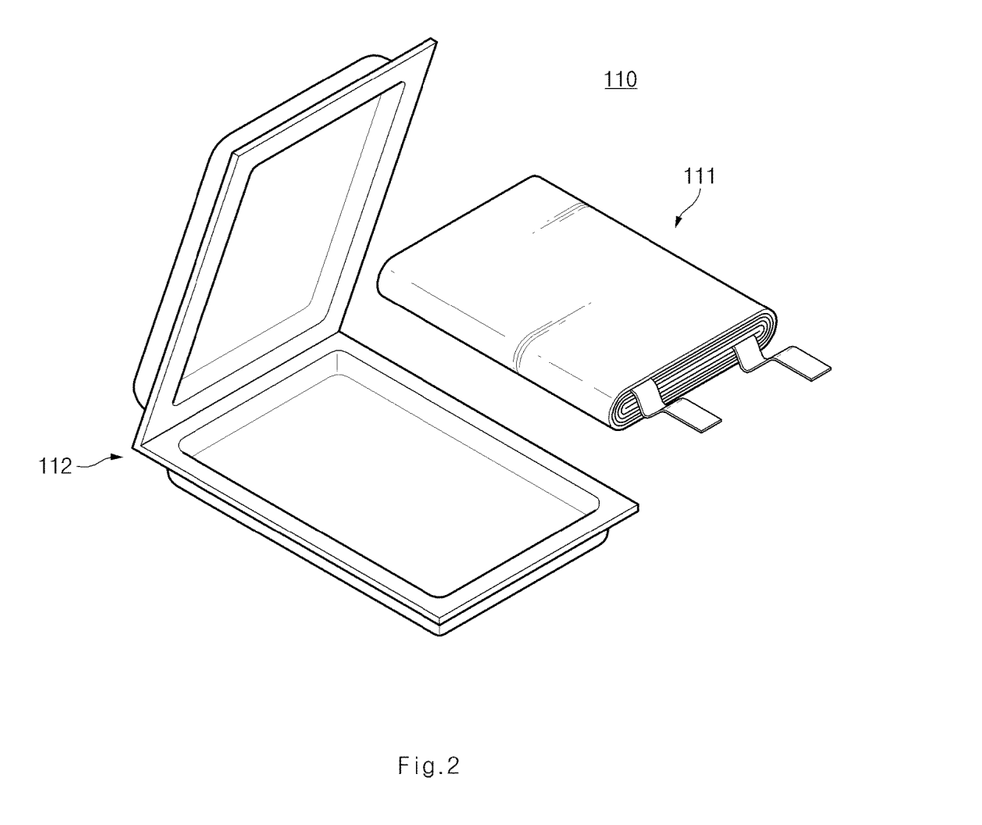
FIG. 2 is a perspective view of a battery cell of the battery module according to the present invention.
Figure 3:
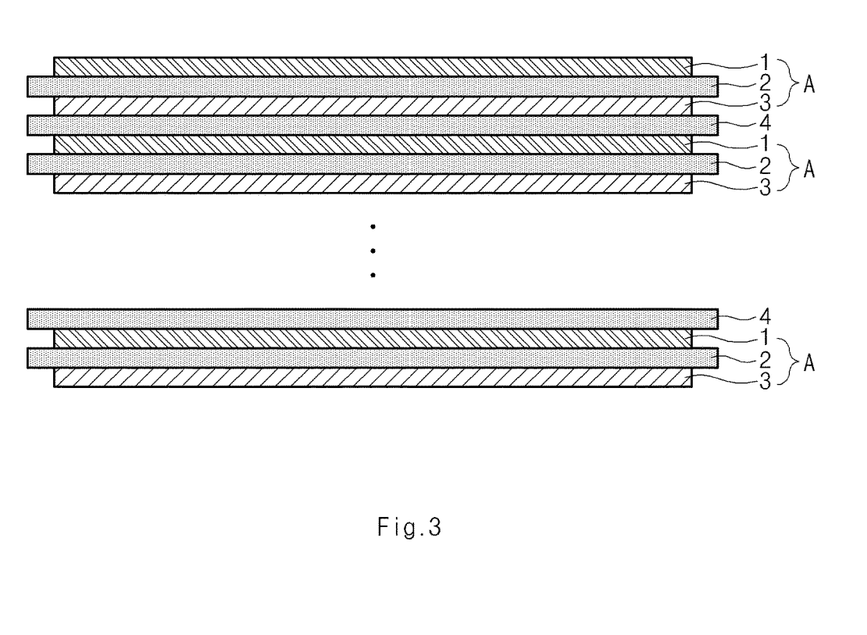
FIG. 3 is a view of an electrode assembly of the battery cell according to the present invention.

As illustrated in FIGS. 1 to 3, a battery module 100 according to an embodiment of the present invention may include a battery cell 110, a module case 120 in which the battery cell 110 is built, and a flame retardant 130 filled into the module case 120.

Here, referring to FIG. 1, a plurality of battery cells 110 may be connected to each other in series or parallel to realize a required voltage or capacity. Although the structure in which the battery cells 110 are connected to each other in series is described as one embodiment and illustrated in the accompanying drawings of the present invention, the structure in which the battery cells 110 are connected to each other in parallel may be explicitly enabled.

Referring to FIG. 2, each of the battery cells 110 includes an electrode assembly 111, a pouch case 112 in which the electrode assembly 111 is built. Referring to FIG. 3, the electrode assembly 111 may have the form of a unit cell A that is constituted by a negative electrode plate 3, an positive electrode plate 1, and a separator 2 disposed between the negative electrode plate 3 and the positive electrode plate 1 to electrically insulate the negative electrode plate 3 from the positive electrode plate 1 or a structure in which the unit cells A are repeatedly stacked with a separator 4 therebetween.

That is, the battery cell 110 may realize the required voltage or capacity by repeatedly stacking one or more unit cells A each of which is constituted by the negative electrode plate 3, the separator 2, and the positive electrode plate 1.

Referring to FIG. 1, the module case 100 has a sealing structure to sealably accommodate the battery cell 110 and prevent the flame retardant from leaking. The module case 100 may include a sealing container 121 having an accommodation space for accommodating the battery cell 110 and a cover 122 for finishing the accommodation space of the sealing container 121. Here, the sealing container 121 may be coupled to the cover 122 by a coupling member.

Figure 4:
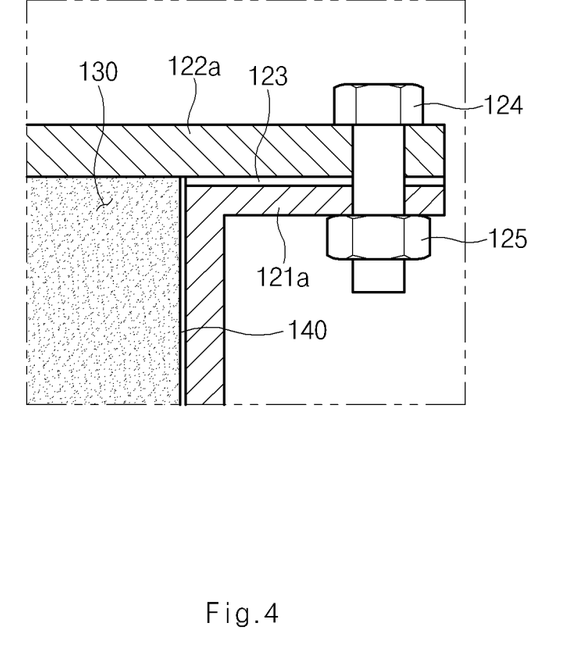
FIG. 4 is an enlarged view of a portion A of FIG. 1.

As illustrated in FIG. 4, the coupling member may be constituted by a bolt 124 and a nut 125. The bolt 124 may successively passes through the cover 122 and the sealing container 121 and then be coupled to the nut 125, thereby coupling the sealing container 121 to the cover 122.

That is, in the module case 120, the battery cell 110 is accommodated in the accommodation space of the sealing container 121, and the cover 122 is disposed on a top surface of accommodation space of the sealing container 121. Then, an upper end 121*a* of the sealing container 121 and an outer end 122*a* of the cover 122, which are closely attached to each other, may be coupled to be sealed through the bolt 124 and the nut 125.

Here, as illustrated in FIG. 4, the module case 120 may further include a sealing member 123 to increase a sealing force. The sealing member 123 is disposed on a contact surface on which the sealing container 121 is closely attached to the cover 122 along a circumferential surface between the upper end 121*a* of the sealing container 121 and the outer end 122*a* of the cover 122. Thus, the sealing force between the upper end 121*a* of the sealing container 121 and the outer end 122*a* of the cover 122 may increase.

The sealing member 123 may be an O-ring or a gasket. The O-ring or the gasket may be selectively applied according to a contact surface between the upper end 121*a* of the sealing container 121 and the outer end 122*a* of the cover 122.

An insulation layer 140 may be disposed on an inner circumferential surface of the module case 120. The insulation layer 140 may protect the battery cell 110 from the outside and also prevent electricity or heat generated from the battery cell 110 from being emitted to the outside.

The flame retardant 130 permeates into a damaged portion of the battery cell 110 to form an insulation film. For this, the flame retardant 130 may be filled in the accommodation space of the sealing container 121 of the module case 120.

Here, the flame retardant 130 may be provided with flame retardant oil. That is, the flame retardant 130 may be provided with the flame retardant oil so that the flame retardant 130 quickly permeates into the damaged portion of the battery cell 110 when the battery cell 110 is damaged and thus to prevent fire and explosion of the battery module.

In an embodiment, the flame retardant oil may have about 80 wt % to about 95 wt % of base oil, about 1 wt % to about 5 wt % of anti-abrasive, about 1 wt % to about 5 wt % of organic molybdenum (Mo), and about 1 wt % to about 5 wt % of additive. That is, the base oil is widely used as a lubricant for a gear device. The base oil may cool the battery cell and permeate into the damaged portion of the battery cell to form the insulation film. Thus, the base oil may reduce friction and abrasion to prevent the battery cells from being attached to each other. Zinc Dialkydithiophosphate may be used as the anti-abrasive to increase performance of the base oil. Here, if a content of the anti-abrasive in the flame retardant oil is high, the flame retardant oil is reduced in chemical stability, and thus about 1 wt % to about 5 wt % of anti-abrasive may be suitable. The organic molybdenum may increase a use period of the anti-abrasive, and molybdenum dithiocarbamate (MoDTC) and molybdenum dithiophosphate (MoDTP) may be used alone or in combination. Here, about 1 wt % to about 5 wt % of organic molybdenum may be suitable. When the flame retardant oil has about 0.01 wt % or less of organic molybdenum, the use period of the anti-abrasive may not increase. When the flame retardant oil has about 5 wt % or more of organic molybdenum, sludge may be generated at a high temperature.

In another embodiment, silicone may be used instead of the flame retardant oil.

The flame retardant 130 is filled in a state where the sealing container 121 and the cover 122 are coupled to be sealed. Here, an injection part 122*b* may be disposed on the cover 122 to inject the flame retardant 130. That is, when viewed in FIG. 1, the injection part 122*b* protrudes upward from the cover 122. Also, a check valve 122*c* for preventing the flame retardant 130 from flowing backward may be disposed in the injection part 122*b*.

Like this, since the flame retardant 130 is filled in the state where the sealing container 121 and the cover 122 are coupled to be sealed, the flame retardant 130 may be stably filled into an entire accommodation space of the sealing container 121.

When the flame retardant 130 is completely filled, the injection part 122*b* may be finished to be sealed. For example, a sealing stopper (not shown) may be inserted into seal the injection part 122*b*, or the injection part 122*b* may be thermally bonded to be sealed in a state where a lower end of the injection part 122*b* connected to the cover 122 is press-fitted. Here, after the sealing, an upper end of the injection part 122*b* may be cut to reduce a height of the battery module.

The flame retardant 130 may have viscosity. For example, the flame retardant 130 may be provided with grease. That is, when there is an object passing from the outside to the inside of the battery module, the flame retardant 130 having viscosity may be attached to a surface of the object to naturally form an insulation film. Moreover, even though a large crack or hole occurs in an outer portion of the battery module, the leakage of the flame retardant 130 may be delayed as much as possible.

The flame retardant 130 may have non-conductivity. That is, a short circuit due to the flame retardant 130 permeating into the damaged portion of the battery cell 110 may be prevented.

An example in use of the battery module having the structure according to the present invention will be described as follows.

As illustrated in FIG. 1, the plurality of battery cells 110 connected to each other in series are accommodated in the accommodation space of the sealing container 121, and then the sealing container 121 is coupled to the cover 122 to assemble the module case 120. Here, the sealing member 123 is inserted into the contact surface between the sealing container 121 and the cover 122 to increase the sealing force.

Then, the flame retardant 130 is injected through the injection part 122b of the module case 120. Here, the flame retardant oil having viscosity and non-conductivity may be used as the flame retardant 130. When the flame retardant 130 is completely injected, the injection part 122b may be finished to be sealed, and thus the assembly of the battery module 100 is completed.

Figure 5:
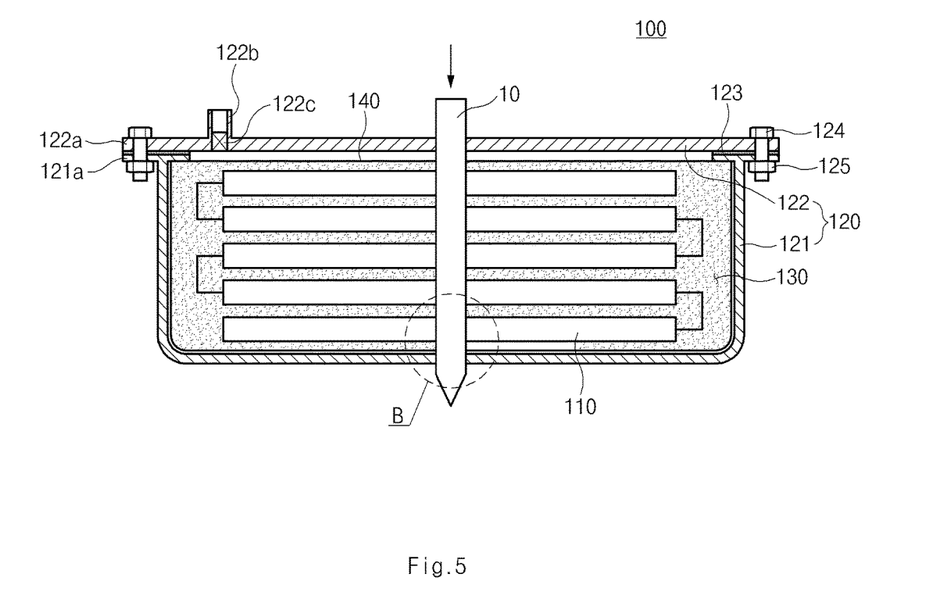
FIG. 5 is a view illustrating a state in which an insulation film is formed on a damaged portion of the battery module by a flame retardant according to the present invention.

As illustrated in FIG. 5, when an object that is an external metal object passes from the outside to the inside of the battery module 100, for example, when a nail 10 that is the metal object passes from the outside to the inside of the battery module 100 to damage at least one battery cell 110, the negative electrode and positive electrode of the electrode assembly 111 included in the battery cell 110 may be electrically connected to each other by the nail 10 that is the metal object to cause the short circuit. Therefore, high current may flow in the battery cell 110 without resistance, and thus the battery cell 110 may be overloaded to cause fire and explosion in company with high heat.

Figure 6:
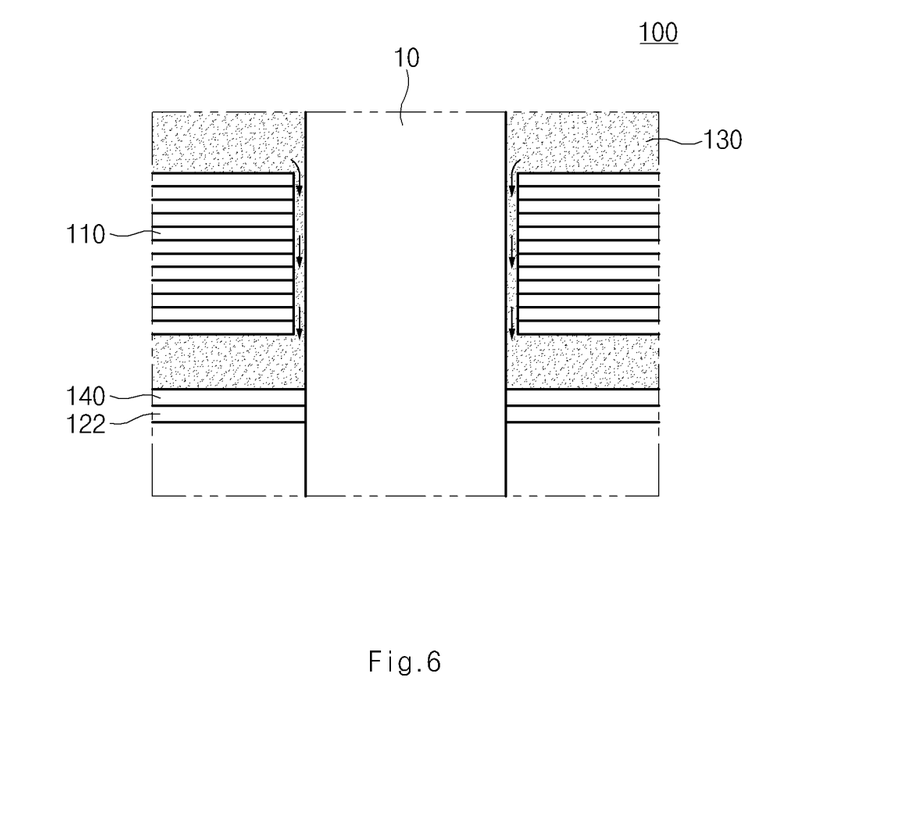
FIG. 6 is a partially enlarged view of a portion B of FIG. 5.

Here, as illustrated in FIG. 6, while the nail 10 that is the metal object damage the battery cell 110 while passing through the battery cell 110, the flame retardant 130 may permeate into the damaged portion of the battery cell 110 to form the insulation film between the nail 10 and the damaged portion of the battery cell 110. The insulation film may prevent the short circuit of the battery cell 110 from occurring to prevent the fire and explosion in company with the high heat of the battery cell 110.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A battery module comprising:
    a battery cell;
    a module case having an accommodation space, the battery cell being located in the accommodation space of the module case; and
    an injectable flame retardant entirely filled in the accommodation space of the module case so as to surround the battery cell,
    wherein the module case comprises:
        a sealing container having an open upper end, the sealing container defining the accommodation space for accommodating the battery cell; and
        a cover attached to the open upper end of the sealing container to seal the accommodation space of the sealing container, the cover extending entirely across the open upper end, the cover having a first surface adjacent the battery cell and a second surface opposite the first surface, the cover having an injection part in the second surface for injecting the flame retardant into the accommodation space of the sealing container through the cover, and a thermally bonded portion being disposed on a lower end of the injection part to seal the lower end of the injection part.

2. The battery module of claim 1, wherein, when the battery cell is damaged to cause a short circuit, the flame retardant permeates into the short-circuited portion of the battery cell to form an insulation film.

3. The battery module of claim 1, wherein the flame retardant comprises flame retardant oil.

4. The battery module of claim 3, wherein the flame retardant oil comprises about 80 wt % to about 95 wt % of base oil, about 1 wt % to about 5 wt % of anti-abrasive, about 1 wt % to about 5 wt % of organic molybdenum, and about 1 wt % to about 5 wt % of additive.

5. The battery module of claim 1, wherein the flame retardant has viscosity.

6. The battery module of claim 1, wherein the flame retardant comprises grease.

7. The battery module of claim 1, wherein the flame retardant has non-conductivity.

8. The battery module of claim 1, wherein the battery cell is provided in plurality, and the plurality of battery cells are built in the module case in a state where the battery cells are connected to each other in series or parallel.

9. The battery module of claim 1, wherein the module case comprises a sealing member disposed on a contact surface on which the sealing container is closely attached to the cover.

10. The battery module of claim 9, wherein the sealing container and the cover are coupled to each other on the contact surface on which the sealing container is closely attached to the cover by using a bolt and a nut.

11. The battery module of claim 9, wherein a check valve for preventing the flame retardant injected into the accommodation space from flowing backward is disposed in the injection part.

12. The battery module of claim 9, wherein the injection part is finished after the flame retardant is injected.

13. The battery module of claim 1, wherein an insulation layer is disposed on an inner circumferential surface of the module case.

14. The battery module of claim 1, wherein the battery cell comprises:
    an electrode assembly; and
    a pouch case in which the electrode assembly is built.

15. The battery module of claim 14, wherein the electrode assembly has the form of a unit cell that is constituted by a negative electrode plate, an positive electrode plate, and a separator disposed between the negative electrode plate and the positive electrode plate to electrically insulate the negative electrode plate from the positive electrode plate or a structure in which unit cells are repeatedly stacked with a separator therebetween.

* * * * *